United States Patent [19]

Tanaka et al.

[11] Patent Number: 6,108,155
[45] Date of Patent: Aug. 22, 2000

[54] RECORDING OR REPRODUCING APPARATUS AND METHOD FOR TAKING UP TAPE WHEN EJECTING TAPE CASSETTE

[75] Inventors: Shuya Tanaka, Kanagawa-ken; Junji Kobayashi, Tokyo, both of Japan

[73] Assignee: Canon Kabushiki Kaisha, Tokyo, Japan

[21] Appl. No.: 07/989,333

[22] Filed: Dec. 11, 1992

[30] Foreign Application Priority Data

Dec. 20, 1991 [JP] Japan .................................. 3-338188

[51] Int. Cl.[7] .......................... G11B 15/18; G11B 15/665
[52] U.S. Cl. ............................................. 360/71; 360/74.1
[58] Field of Search ................................. 360/69, 71, 85, 360/137, 74.1

[56] References Cited

U.S. PATENT DOCUMENTS

| | | | |
|---|---|---|---|
| 4,011,588 | 3/1977 | Yasuda et al. | 360/71 |
| 4,951,161 | 8/1990 | Suzuki et al. | 360/71 |
| 5,189,524 | 2/1993 | Yoshida et al. | 360/71 |
| 5,461,520 | 10/1995 | Kobayashi et al. | 360/71 |

FOREIGN PATENT DOCUMENTS

| | | |
|---|---|---|
| 0170949 | 6/1989 | Japan . |
| 0479052 | 6/1992 | Japan . |

*Primary Examiner*—Aristotelis Psitos
*Assistant Examiner*—Jim L Habermehl
*Attorney, Agent, or Firm*—Robin, Blecker, Daley & Driscoll

[57] ABSTRACT

A magnetic recording or reproducing apparatus having a rotary drum includes a sensor for detecting dew condensation on the rotary drum, a take-up reel for taking up a recording medium, and a controller for controlling the rotary drum and the take-up reel in accordance with a result of detection provided by the sensor. When dew condensation has been detected by the sensor, the controller causes the rotary drum to rotate in such a way as to release the recording medium from a state of sticking to the rotary drum and, after that, causes the recording medium to be taken up by the take-up reel.

7 Claims, 7 Drawing Sheets

RECORDING OR REPRODUCING APPARATUS AND METHOD FOR TAKING UP TAPE WHEN EJECTING TAPE CASSETTE

BACKGROUND OF THE INVENTION

1. Field of the Invention

This invention relates to a recording or reproducing apparatus, and more particularly to a method for taking up a magnetic tape when, for example, a tape cassette is to be ejected from a magnetic recording or reproducing apparatus.

2. Description of the Related Art

Heretofore, magnetic recording or reproducing apparatuses such as VTRs (video tape recorders) have been arranged such that, when dew condensation takes place, a tape loading state of the apparatus is canceled according to a signal from a dew condensation sensor, a reel is rotated to have a magnetic tape rewound to stow it in a tape cassette, and, after that, the tape cassette is ejected from the apparatus.

According to the conventional arrangement, however, the magnetic tape is rewound solely by the rotation of the reel. Therefore, if the magnetic tape is stuck to a rotary drum due to dew condensation, it is sometimes impossible to pull the magnetic tape off the rotary drum. The tape cassette then might be ejected without having the magnetic tape completely stowed into the tape cassette. Under such a condition, the magnetic tape tends to be either damaged or broken.

SUMMARY OF THE INVENTION

This invention is directed to the solution of the above-stated problem of the prior art. Therefore, it is an object of the invention to provide a magnetic recording or reproducing apparatus which is arranged such that a tape cassette is never ejected in a state of having a magnetic tape incompletely stowed in the tape cassette.

To attain this object, a magnetic recording or reproducing apparatus having a rotary drum and arranged as an embodiment of this invention comprises detecting means for detecting dew condensation on the rotary drum; take-up means for taking up a recording medium; and control means for controlling the rotary drum and the take-up means according to a result of detection provided by the detecting means, the control means causing, when the detecting means has detected dew condensation, the rotary drum to rotate in such a way as to release the recording medium from a state of sticking to the rotary drum and, after that, causing the recording medium to be taken up by the take-up means.

A magnetic recording or reproducing apparatus having a rotary drum and arranged as another embodiment of this invention comprises detecting means for detecting dew condensation on the rotary drum; guide means for guiding a recording medium to wrap the recording medium around the rotary drum; take-up means for taking up the recording medium; and control means for controlling the rotary drum, the guide means and the take-up means according to a result of detection provided by the detecting means, the control means causing, when the detecting means has detected dew condensation, the guide means to effect an unwrapping operation for unwrapping the recording medium away from the rotary drum and the take-up means to effect a take-up operation for taking up the recording medium, after that, causing the guide means to effect a wrapping operation for wrapping the recording medium around the rotary drum, and, further after that, causing the guide means to effect the unwrapping operation and the take-up means to take up the recording medium.

The above and other objects and features of the invention will become apparent from the following detailed description of embodiments thereof taken in connection with the accompanying drawings.

DETAILED DESCRIPTION OF THE PREFERRED EMBODIMENTS

An embodiment of this invention is described in detail below with reference to the drawings.

Figure 1:
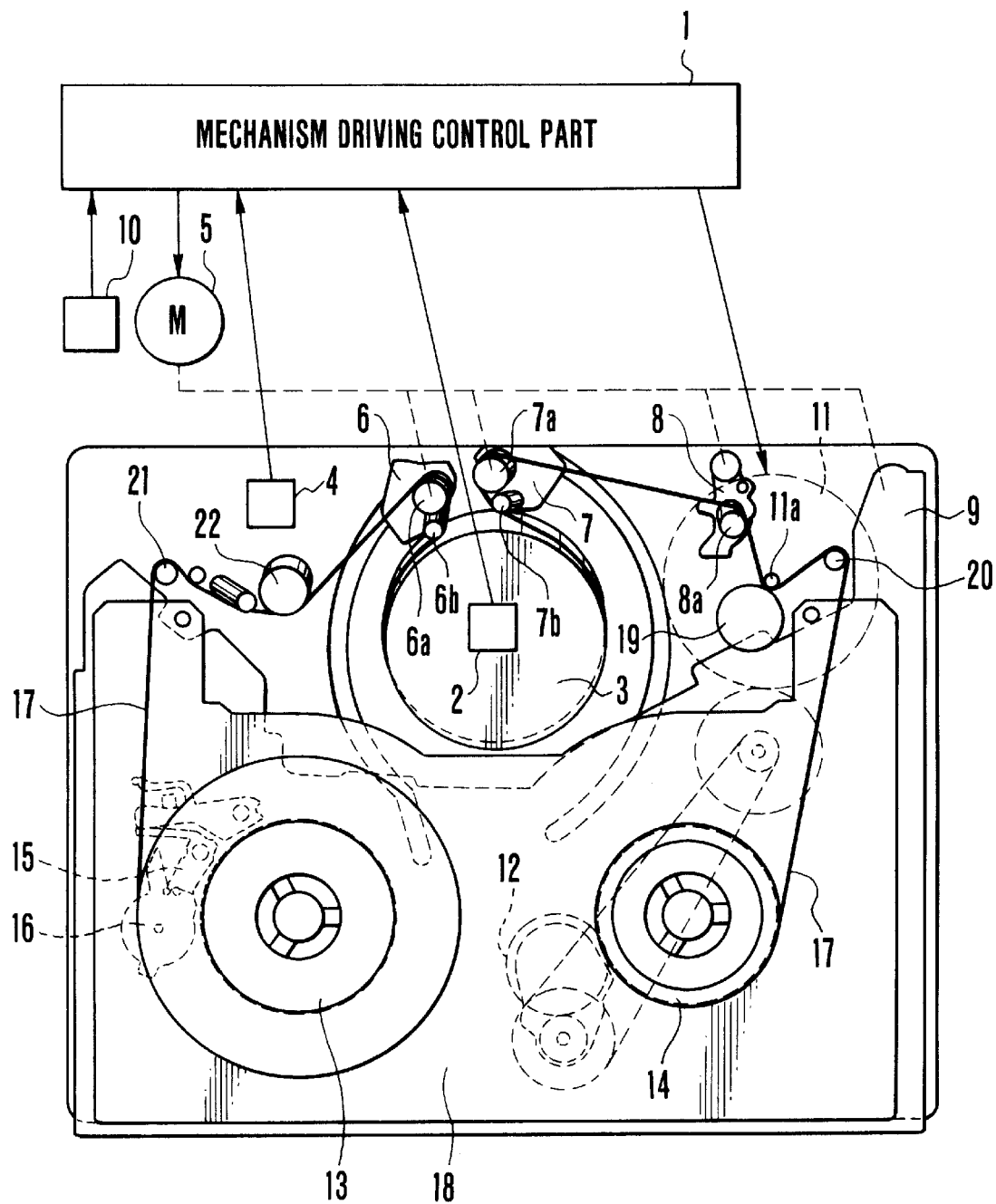
FIG. 1 is a combination of a block diagram and a look-through view showing by way of example the arrangement of an embodiment of this invention.

FIG. 1 shows by way of example the arrangement of the embodiment in a combination of a block diagram and a look-through view. Referring to FIG. 1, the embodiment includes a mechanism driving control part 1. A drum speed detecting part 2 is arranged to detect the rotating speed of a rotary drum 3 and to output information on the result of speed detection to the mechanism driving control part 1. A dew condensation sensor 4 is arranged to output information on dew condensation to the mechanism driving control part 1. A loading motor 5 is arranged to move tape guides 6, 7 and 8, guide posts 20 and 21 and a slide chassis 9 in accordance with an instruction given from the mechanism driving control part 1. The tape guide 6 is provided with a guide roller 6a and an oblique post 6b. The tape guide 7 is provided with a guide roller 7a and an oblique post 7b. The tape guide 8 is provided with a guide roller 8a.

A loading mode sensor 10 is arranged to output information on a tape-loading-mode shifting state to the mechanism driving control part 1. A capstan motor 11 is arranged to be controlled by the mechanism driving control part 1. A driving change-over gear 12 is arranged to transmit the driving force of the capstan motor 11 either to a supply reel 13 or to a take-up reel 14 via a supply reel base or a take-up reel base which is not shown.

A one-way brake 15 is arranged to operate to prevent the supply reel 13 from rotating in the direction of supplying the tape. A brake release gear 16 is arranged to release the braking action of the one-way brake 15 at the time of tape loading. Reference numeral 17 denotes a magnetic tape. Reference numeral 18 denotes a tape cassette. Reference numeral 19 denotes a pinch roller. Reference numeral 22 denotes an impedance roller.

Referring again to FIG. 1, a tape path is formed for the magnetic tape 17. The tape path begins at the supply reel 13 and ends at the take-up reel 14. Within the tape path, the magnetic tape 17 extends through the guide post 21, the impedance roller 22, the guide roller 6*a* and the oblique post 6*b*, is wrapped around the rotary drum 3, extends further through the guide roller 7*a*, the oblique post 7*b* and the guide post 8*a*, is pressed in between the capstan 11*a* and the pinch roller 19, and, after that, comes through the guide post 20 to the take-up reel 14.

Figure 2:
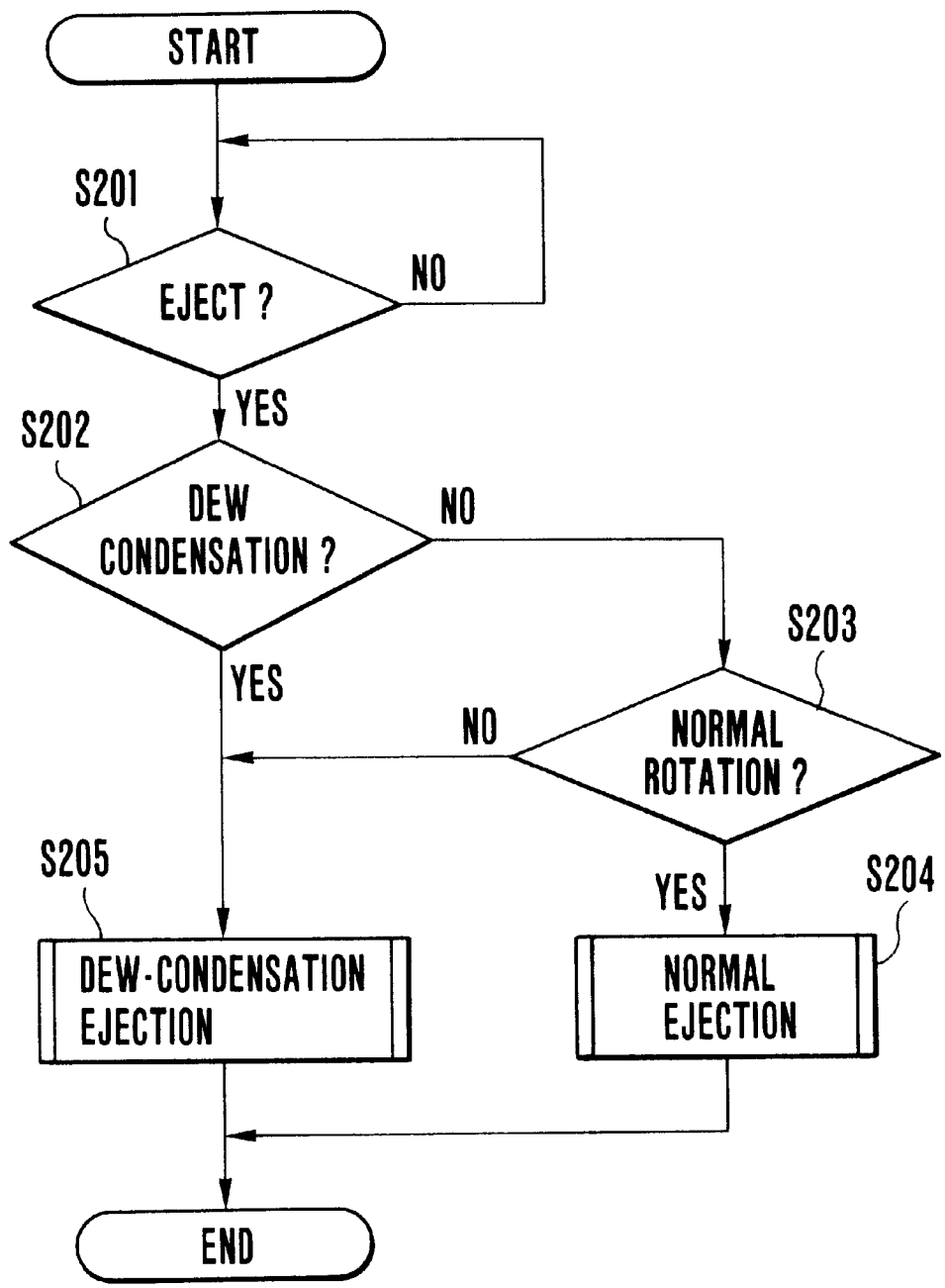
FIG. 2 is a flow chart showing by way of example the operation of a mechanism driving control part of the embodiment shown in FIG. 1.

The mechanism driving control part 1 operates as follows: FIG. 2 is a flow chart showing by way of example the operation of the mechanism driving control part 1. Referring to FIG. 2, a step S201 is provided for making a decision as to the ejection of the tape cassette 18 (hereinafter referred to as cassette eject). A check is made in a looping manner for the cassette eject until an eject switch is pushed. The flow of operation proceeds to a next step S202 when the eject switch is pushed.

At the step S202, a check is made for input of dew condensation information from the dew condensation sensor 4. If the dew condensation information is inputted from the sensor 4, the flow comes to a step S205. If not, the flow proceeds to a step S203. At the step S203, a check is made for input of information from the drum speed detecting part 2 indicating the normal rotation of the rotary drum 3. If the information on the normal rotation of the rotary drum 3 is inputted, the flow comes to a step S204. If not, i.e., in a case where the rotational frequency, or number of revolutions, of the rotary drum 3 happens to decrease, the flow comes to the step S205. The step S203 is provided against such a case where dew condensation has already taken place on the rotary drum 3 but has not been detected by the dew condensation sensor 4 as yet, because in such a case, the magnetic tape 17 might stick to the rotary drum 3 to prevent the normal rotation of the rotary drum 3.

At the step S204, the tape cassette 18 is ejected in a normal manner (hereinafter referred to as the normal ejection). At the step S205, the tape cassette 18 is ejected in such a way as to ensure that the tape cassette 18 is ejected in an adequate state under the condition of having dew condensation (hereinafter referred to as the dew-condensation ejection). This embodiment is characterized by the dew-condensation ejection.

Figure 3:
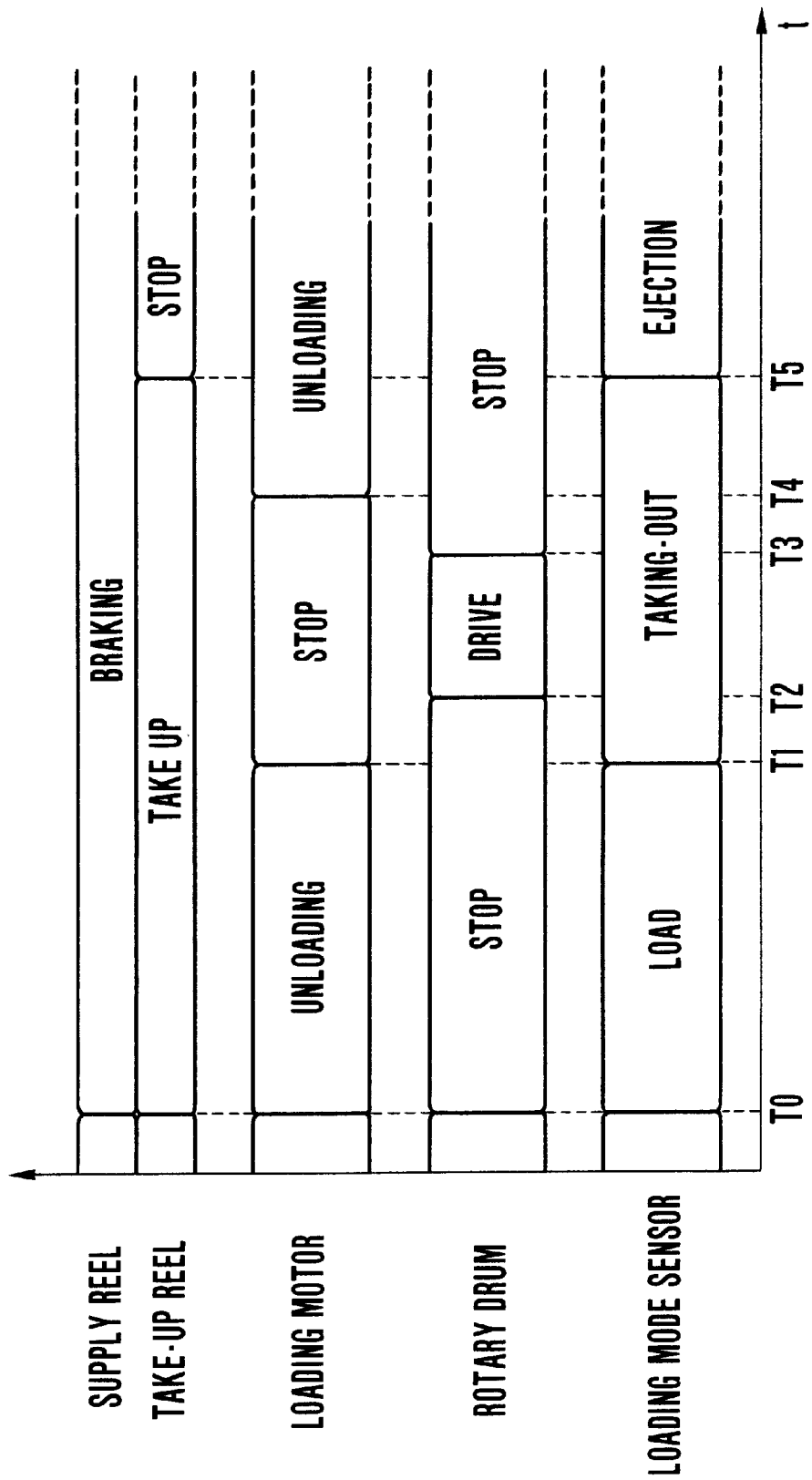
FIG. 3 is a timing chart showing by way of example the operation of a mechanism for "dew-condensation ejection" in the embodiment shown in FIG. 1.

FIG. 3 is a timing chart showing by way of example the operation of the embodiment to be performed in the event of the dew-condensation ejection.

Referring to FIGS. 1 and 3, the dew-condensation ejection is described as follows: at a timing point T0 of the timing chart of FIG. 3, the loading motor 5 begins to make an unloading rotation. Then, the brake is applied to the supply reel 13. The take-up reel 14 begins to take up the tape 17. The rotary drum 3 comes to a stop. The output of the loading mode sensor 10 indicates a load mode. At a next timing point T1, the rotation of the loading motor 5 comes to a stop when the output of the loading mode sensor 10 comes to indicate a taking-out mode. During a period between timing points T2 and T3, the rotary drum 3 is driven. At a timing point T4, the loading motor 5 again begins to make an unloading rotation. At a timing point T5, the take-up reel 14 stops taking up the tape 17, and the tape cassette 18 begins to be ejected.

Figure 4:
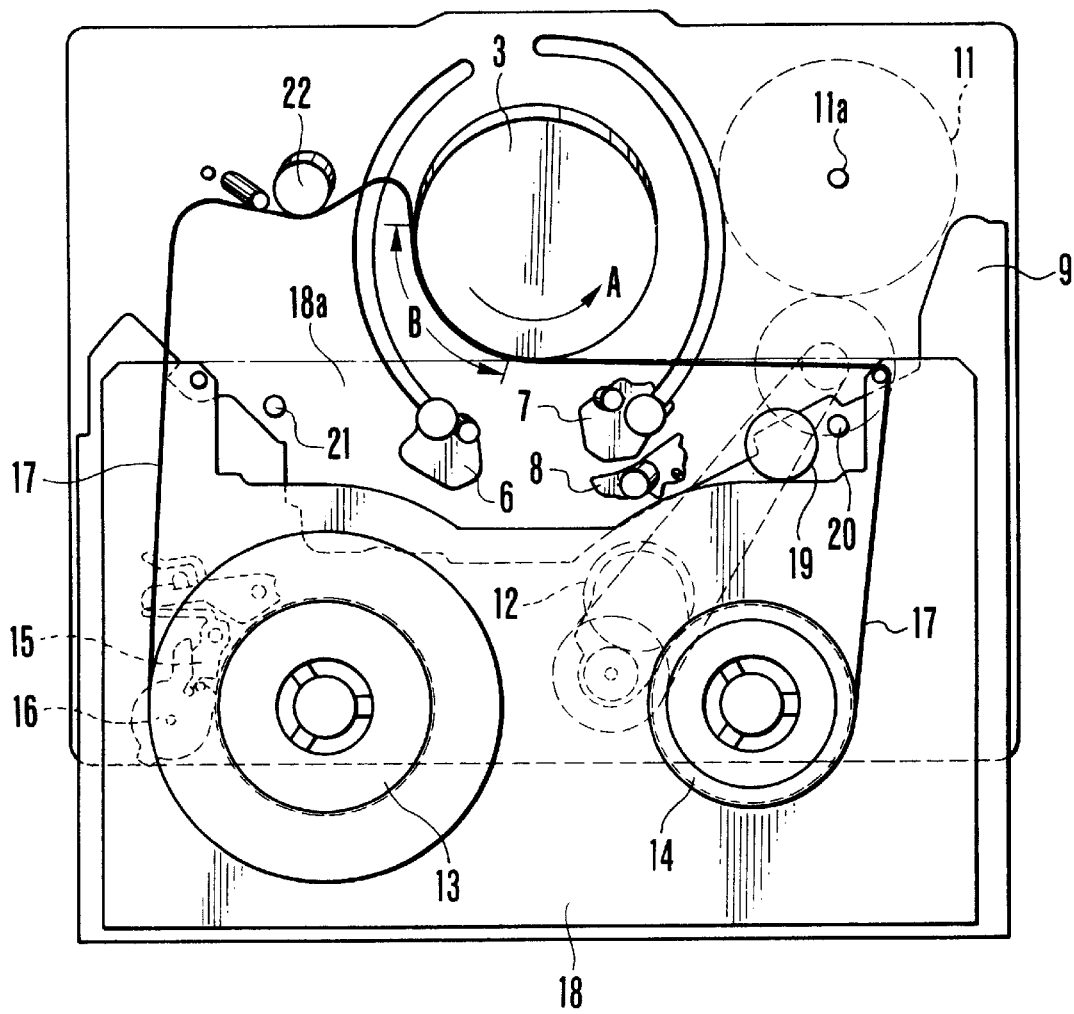
FIG. 4 is a look-through view showing by way of example a state obtained at a timing point T2 of FIG. 3.

FIG. 4 shows a state obtained at the timing point T2 of FIG. 3. Referring to FIG. 4, the guide posts 20 and 21, the tape guides 6, 7 and 8 and the pinch roller 19 move to the inside of an opening part 18*a* provided in the tape cassette 18 in such a way as to allow the magnetic tape 17 to be stowed into the tape cassette 18 by the rotation of the take-up reel 14. However, since the magnetic tape 17 is sticking to the rotary drum 3 within a range indicated by an arrow B due to dew condensation, the magnetic tape 17 cannot be completely taken up on the take-up reel 14.

In that event, the rotary drum 3 is caused to rotate in the direction of advancing the magnetic tape 17 toward the take-up reel 14 (in the direction of an arrow A). Since the brake is applied to the supply reel 13 at this moment, the magnetic tape 17 is not supplied from the supply reel 13, and, therefore, the sticking portion of the magnetic tape 17 within the range indicated by the arrow B is allowed to separate from the rotary drum 3.

Figure 5:
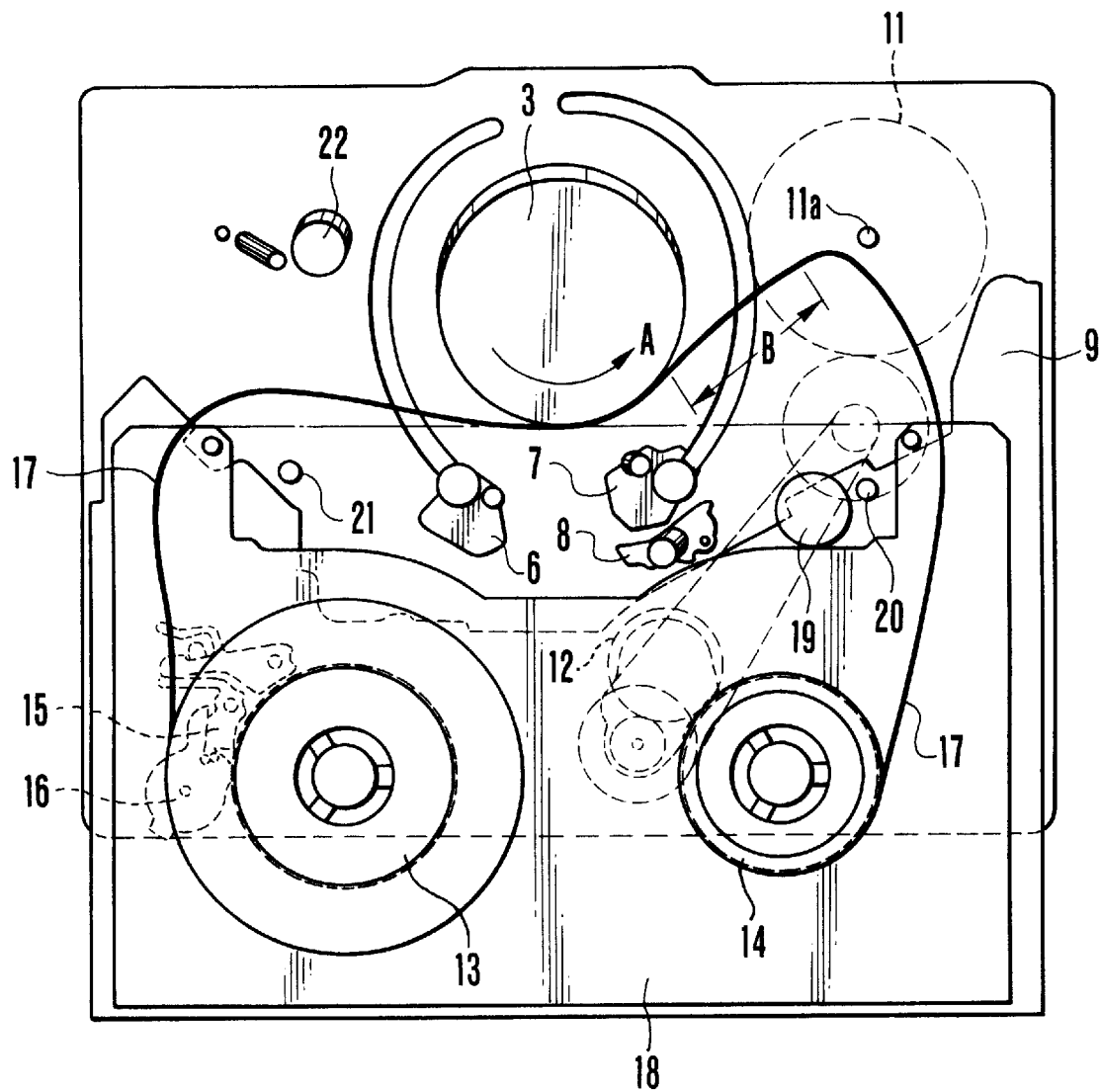
FIG. 5 is a look-through view showing by way of example a state obtained at a timing point T3 of FIG. 3.

FIG. 5 shows a state obtained at the timing point T3 of FIG. 3. Referring to FIG. 5, the magnetic tape 17 which has separated from the rotary drum 3 as mentioned above is caused to be stowed into the tape cassette 18 by the rotation of the take-up reel 14.

As described above, according to the embodiment, in the event of ejecting the tape cassette 18 by unloading the magnetic tape 17 when dew condensation takes place with the magnetic tape in a loaded state, the magnetic tape 17 is first released from a tape loading action, and, after that, the rotary drum 3 is caused to rotate in the direction of advancing the magnetic tape 17 toward the take-up reel 14. This arrangement enables the magnetic tape 18 which is sticking to the rotary drum 3 due to dew condensation to separate from the rotary drum 3 without fail. Therefore, the tape cassette 18 can be prevented from being ejected with the magnetic tape 17 left in a state of incompletely stowed in the tape cassette 18.

The following describes a second embodiment of this invention. In the following description, the parts of the second embodiment which are arranged in the same manner as those of the first embodiment are suffixed with the same reference numerals as the first embodiment and the details of them are omitted. The second embodiment differs from the first embodiment in the following point: in the case of the first embodiment, the magnetic tape 17 sticking to the rotary drum 3 due to dew condensation is caused to separate from the rotary drum 3 by the rotation of the rotary drum 3. In the case of the second embodiment, the sticking tape 17 is caused to separate from the rotary drum 3 by again carrying out a tape loading action. The dew-condensation ejection of the step S205 of FIG. 2 is thus executed in a different manner. With the exception of this point, the second embodiment is arranged and operates in the same manner as the first embodiment.

Figure 6:
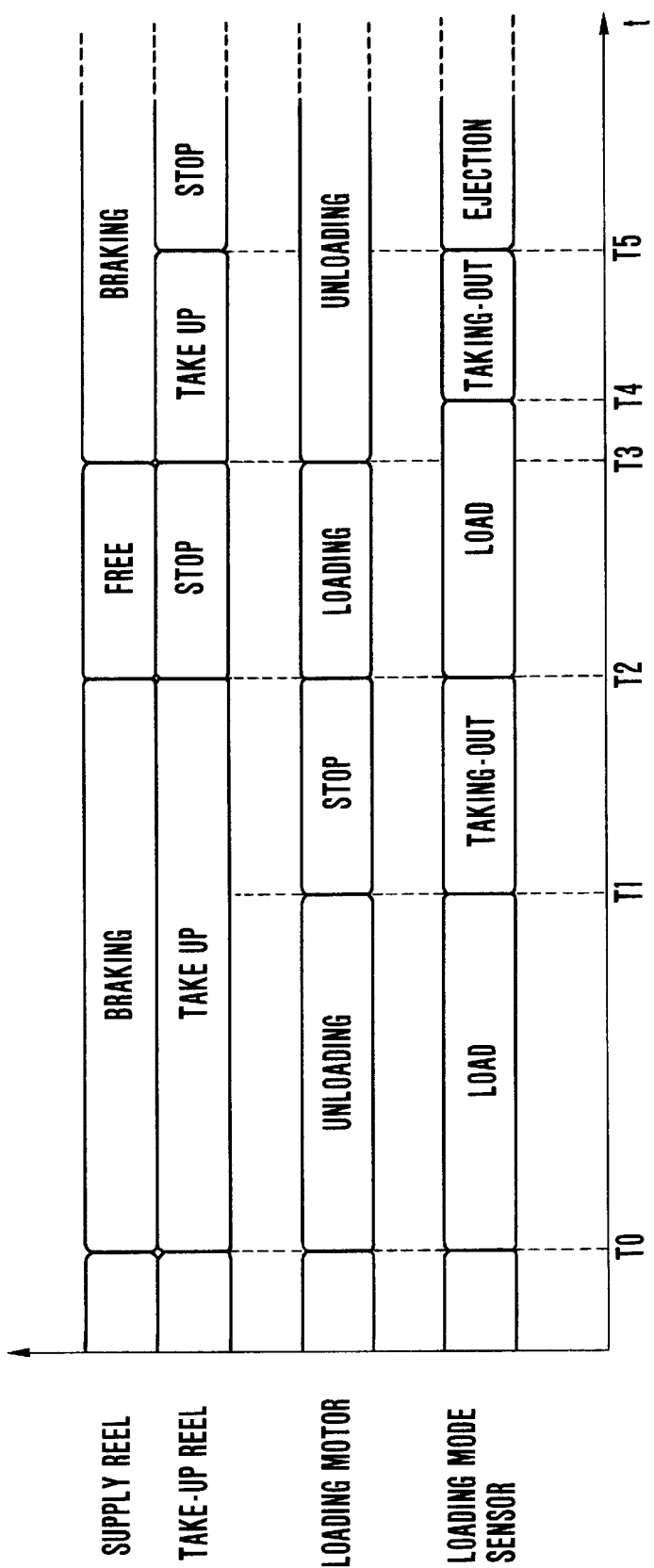
FIG. 6 is a timing chart showing by way of example the operation of a mechanism for "dew-condensation ejection" of a second embodiment of this invention.

FIG. 6 is a timing chart showing by way of example the operation of the mechanism of the second embodiment performed for the dew-condensation ejection.

At a timing point T0 of FIG. 6, the loading motor 5 begins to rotate for unloading the tape 17. The brake is applied to the supply reel 13. The take-up reel 14 begins to take up the tape 17. The output of the loading mode sensor 10 indicates a load mode. At a next timing point T1, when the output of the loading mode sensor 10 comes to indicate a taking-out mode, the rotation of the loading motor 5 is brought to a stop.

At a timing point T2, the loading motor 5 begins to rotate for loading the tape 17. The supply reel 13 is released from the brake. The capstan motor 11 is brought to a stop. The rotation of the take-up reel 14 is also brought to a stop. At this moment, the brake is applied to the take-up reel 14 by leaving the driving change-over gear 12 in connection with the take-up reel 14.

At a timing point T3, the loading motor 5 begins to rotate for unloading the tape 17. The supply reel 13 is braked. The take-up reel 14 is caused to resume its tape take-up action. At a timing point T4, the output of the loading mode sensor 10 comes to indicate the taking-out mode. At a timing point T5, after the taking-out mode is obtained, the take-up action of the take up reel 14 is brought to a stop and the tape cassette 18 begins to be ejected.

Since the state of the magnetic tape 17 at the timing point T2 is similar to the state obtained in the case of the first embodiment as shown in FIG. 4, it is described below with reference to FIG. 4:

Referring to FIG. 4, the guide posts 20 and 21, the tape guides 6, 7 and 8 and the pinch roller 19 move to the inside of the opening part 18a of the tape cassette 18. The magnetic tape 17 is ready to be stowed into the tape cassette 18 by the rotation of the take-up reel 14. However, in the event of dew condensation, the magnetic tape 17 sticks to the rotary drum 3 within the range indicated by the arrow B. Therefore, it is impossible to have the magnetic tape 17 completely taken up on the take-up reel 14.

In this case, as mentioned in the foregoing, the supply reel 13 is released from the brake and the tape loading action is carried out with the take-up reel 14 left in the braked state. Under this condition, the magnetic tape 17 can be pulled out from the supply reel 13 but cannot be pulled out from the take-up reel 14. The magnetic rape 17 sticking to the rotary drum 3 within the range indicated by the arrow B in FIG. 4 due to dew condensation is, therefore, pulled out toward the take-up reel 14, so that the magnetic tape 17 separates from the rotary drum 3.

Figure 7:
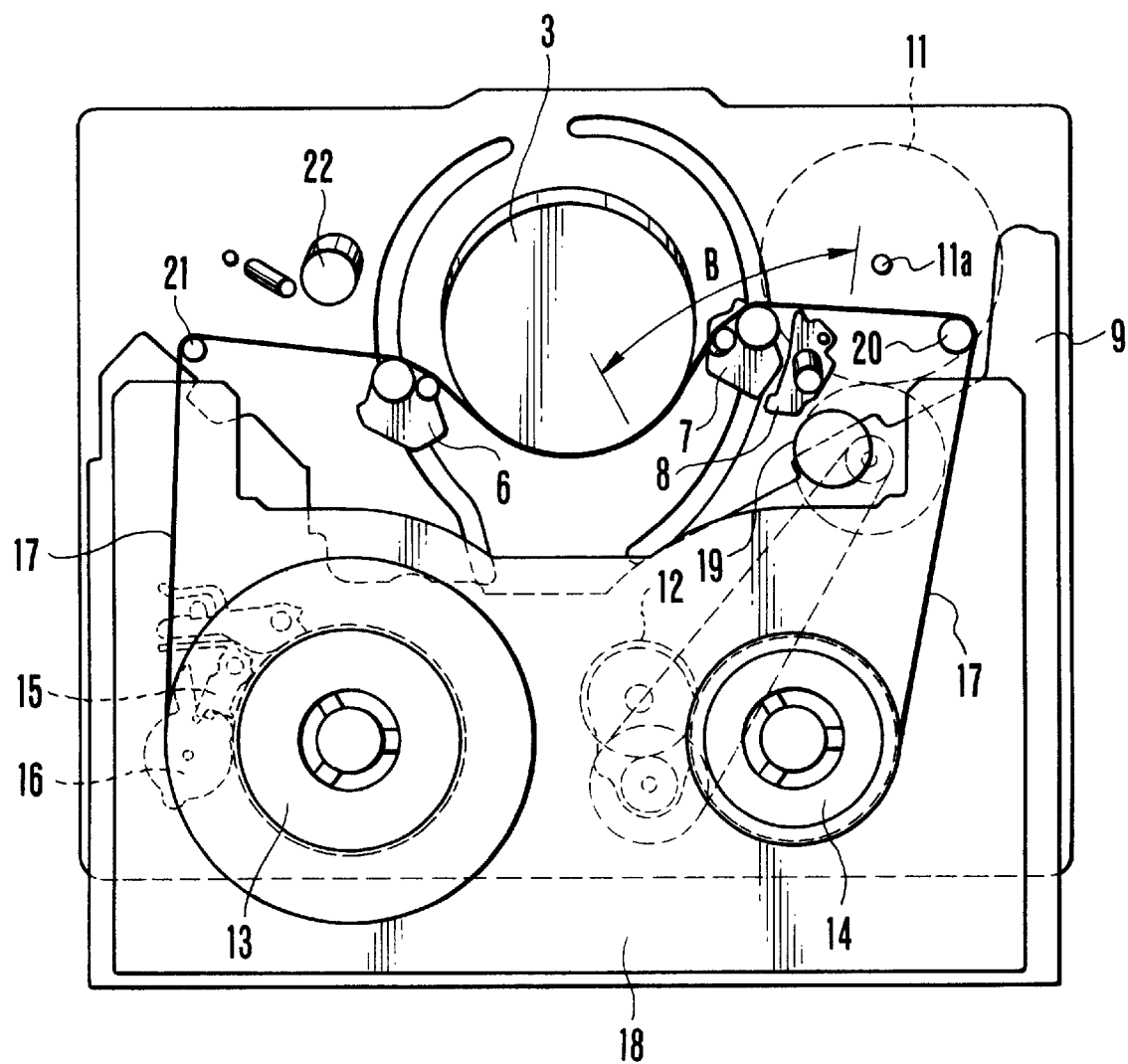
FIG. 7 is a look-through view showing by way of example a state obtained at a timing point T3 of FIG. 6.

FIG. 7 shows a state obtained at the timing point T3 of FIG. 6. Referring to FIG. 7, the magnetic tape 17 which has separated from the rotary drum 3 is subjected to the tape unloading action. After the tape unloading action, the magnetic tape 17 is stowed into the tape cassette 18 by the rotation of the take-up reel 14.

As described above, if dew condensation takes place while the magnetic tape 17 is in a loaded state, the embodiment operates to unload the magnetic tape 17 and eject the tape cassette 18 as follows. The magnetic tape 17 is first released from its loaded state. The magnetic tape 17 is taken up onto the take-up reel 14. After that, the rotation of the take-up reel 14 is suppressed. The rotation of the supply reel 13 is released from its suppressed state. Then, the tape loading action is once again carried out. When the magnetic tape 17 is caused to stick to the rotary drum 3 by dew condensation, this arrangement enables the sticking magnetic tape 17 to separate from the rotary drum 3 without fail, so that the tape cassette 18 can be prevented from being ejected in a state of leaving the magnetic tape 17 incompletely stowed and accommodated therein.

This invention is applicable either to a system consisting of a plurality of apparatuses or to a single apparatus. Further, it goes without saying that the invention applies also to a case where the object of the invention is attainable by supplying a program to a system or to an apparatus.

What is claimed is:

1. A method for taking up a tape wrapped around a rotary drum at the time of ejecting a tape cassette mounted on a recording or reproducing apparatus having said rotary drum, comprising the steps of:

a) detecting if dew condensation is on said rotary drum, and if no dew condensation is detected, the rotational frequency of said rotatory drum is detected;

b) when dew condensation has been detected, stopping said rotary drum from rotating, restricting movement of a tape supply means, and taking up the tape while releasing the tape from a state of being wrapped around said rotary drum;

c) after the tape is released from a state of being wrapped around said rotary drum by a predetermined amount, wrapping the tape again around said rotary drum while restricting movement of a tape take-up means; and d) releasing the tape again from a state of being wrapped around said rotary drum, and then taking up the tape.

2. An apparatus according to claim 1, wherein, said step b) and the steps subsequent to said step b) are carried out when the rotational frequency detected in step a) is not normal.

3. An apparatus according to claim 2, wherein the tape wrapped around the rotary drum is taken up when the rotational frequency is normal.

4. A recording or reproducing apparatus, comprising:

a) a rotary drum;

b) detecting means for detecting dew condensation on said rotary drum;

c) guide means for guiding a recording medium to wrap the recording medium around said rotary drum;

d) supply means for supplying the recording medium;

e) take-up means for taking up the recording medium; and f) control means, responsive to detection of dew condensation by said detecting means, for causing movement of said supply means to be restricted and controlling said guide means to be moved in the direction of releasing the recording medium from a state of being wrapped around said rotary drum and controlling said take-up means to take up the recording medium by a predetermined amount, then causing said guide means to be moved in the direction of wrapping the recording medium around said rotary drum and subsequently causing said guide means to be moved again in the direction of releasing the recording medium from being wrapped around the rotary drum and controlling said take-up means again to take up the recording medium.

5. An apparatus according to claim 4, further comprising a fixed chassis and a slide chassis movable relative to the fixed chassis.

6. An apparatus according to claim 5, wherein the rotary drum is provided on the fixed chassis and the supply means and the take-up means are provided on the slide chassis.

7. An apparatus according to claim 6, wherein the guide means has a guide member movable on the fixed chassis to guide the recording medium.

* * * * *